(12) United States Patent
Legastelois

(10) Patent No.: US 8,991,081 B2
(45) Date of Patent: Mar. 31, 2015

(54) DECORATED CARD

(75) Inventor: Sylvie Legastelois, Asnieres sur Seine (FR)

(73) Assignee: Chanel Parfums Beaute, Neuilly-sur-Seine (FR)

( * ) Notice: Subject to any disclaimer, the term of this patent is extended or adjusted under 35 U.S.C. 154(b) by 326 days.

(21) Appl. No.: 13/496,289

(22) PCT Filed: Sep. 29, 2010

(86) PCT No.: PCT/FR2010/000647
§ 371 (c)(1),
(2), (4) Date: Jul. 5, 2012

(87) PCT Pub. No.: WO2011/039433
PCT Pub. Date: Apr. 7, 2011

(65) Prior Publication Data
US 2012/0276329 A1 Nov. 1, 2012

(30) Foreign Application Priority Data
Oct. 2, 2009 (FR) ...................................... 09 04702

(51) Int. Cl.
*B42D 15/04* (2006.01)
*B42D 3/14* (2006.01)
*B32B 3/24* (2006.01)
*B32B 38/04* (2006.01)
*B32B 3/08* (2006.01)
(Continued)

(52) U.S. Cl.
CPC ................ *B42D 15/04* (2013.01); *B32B 38/04* (2013.01); *B32B 3/085* (2013.01); *B32B 3/14* (2013.01); *B32B 3/266* (2013.01); *B42D 15/042* (2013.01)

USPC ............... 40/124.191; 40/124.01; 40/124.09; 40/124.11; 40/124.12; 428/101; 428/114; 428/131; 428/134; 428/136; 428/137; 428/542.6; 156/161; 156/256; 156/263

(58) Field of Classification Search
USPC ............... 40/124.01, 124.08, 124.09, 124.11, 40/124.12, 124.19, 124.191, 124, 124.4, 40/450, 492
See application file for complete search history.

(56) References Cited

U.S. PATENT DOCUMENTS 1,250,671 A * 12/1917 Scheider ......................... 40/491
1,679,520 A * 8/1928 Giroux ............................ 40/447
(Continued)

FOREIGN PATENT DOCUMENTS

DE    1 871 062 U    4/1963
EP    1 449 678 A1   8/2004
(Continued)

OTHER PUBLICATIONS

Normal, Beth; Tutorial Tuesday: Floating Card, Dec. 16, 2008, <http://www.sunflowers-dragonflies.ca/blog/961/tutorial-tuesday-floating-card/>.*
(Continued)

*Primary Examiner* — Jeff Vonch
(74) *Attorney, Agent, or Firm* — Oliff PLC

(57) ABSTRACT

A decorated card having at least one leaf, and a cutout formed in the leaf and defined by a cutout outline. The card is characterized by the fact that it has at least two threads extending under tension across the cutout outline, and a plurality of spangles, the spangles being held suspended from each of the threads under tension so as to cover at least part of the area defined by the cutout outline. A manufacturing method is also provided.

8 Claims, 5 Drawing Sheets

(51) Int. Cl.
*B32B 3/14* (2006.01)
*B32B 3/26* (2006.01)

(56) References Cited

U.S. PATENT DOCUMENTS

| | | | |
|---|---|---|---|
| 2,133,155 A * | 10/1938 | Stevens | 40/446 |
| 2,345,709 A * | 4/1944 | Lobdell | 40/491 |
| 2,943,416 A | 7/1960 | Barker | |
| 3,061,971 A * | 11/1962 | Fites | 446/150 |
| 3,740,878 A * | 6/1973 | Oelschlaeger | 40/447 |
| 4,313,270 A * | 2/1982 | Volkert et al. | 40/124.08 |
| 4,380,128 A * | 4/1983 | Ichikawa | 40/124.09 |
| 5,303,487 A * | 4/1994 | Olson | 40/124.12 |
| 5,551,730 A * | 9/1996 | Barreca et al. | 283/117 |
| 5,727,487 A * | 3/1998 | Foster et al. | 112/470.05 |
| 5,954,518 A * | 9/1999 | Teichberg | 434/404 |
| 6,629,377 B2 * | 10/2003 | Taraschuk | 40/124.08 |
| D515,624 S * | 2/2006 | Loo | D19/26 |
| 7,441,352 B2 * | 10/2008 | Gardi | 40/124.191 |
| 2002/0064625 A1 * | 5/2002 | Goers et al. | 428/131 |
| 2002/0095835 A1 * | 7/2002 | Vanderburg | 40/491 |
| 2002/0129520 A1 | 9/2002 | Taraschuk | |
| 2003/0230011 A1 * | 12/2003 | Mouyal | 40/124.08 |
| 2007/0289184 A1 * | 12/2007 | Cheng | 40/617 |
| 2010/0011636 A1 * | 1/2010 | Cole | 40/124.09 |

FOREIGN PATENT DOCUMENTS

FR 2 646 126 A1 10/1990
WO WO 2007039190 A1 * 4/2007

OTHER PUBLICATIONS

Eve, "Paper weaving tutorial", Sep. 2008, Folding Trees, <http://foldingtrees.com/2008/09/paper-weaving-tutorial/>.*
Van Laar, Heidi, "Birthday Fishes!", Jun. 2009, Van Laar Designs, <http://vanlaardesigns.blogspot.com/2009/06/birthday-fishes.html>.*
Bonney, Grace, "More Recyling Paper Projects", Jul. 2009, Design Sponge, <http://www.designsponge.com/2009/07/more-recycling-paper-projects.html>.*
May 13, 2014 Notice of Reasons for Rejections issued in Japanese Patent Application No. 2012-531470 (with translation).
Feb. 2, 2011 Written Opinion of the International Searching Authority issued in International Patent Application No. PCT/FR2010/000647.
Feb. 2, 2011 International Search Report issued in International Application No. PCT/FR2010/000647.

* cited by examiner

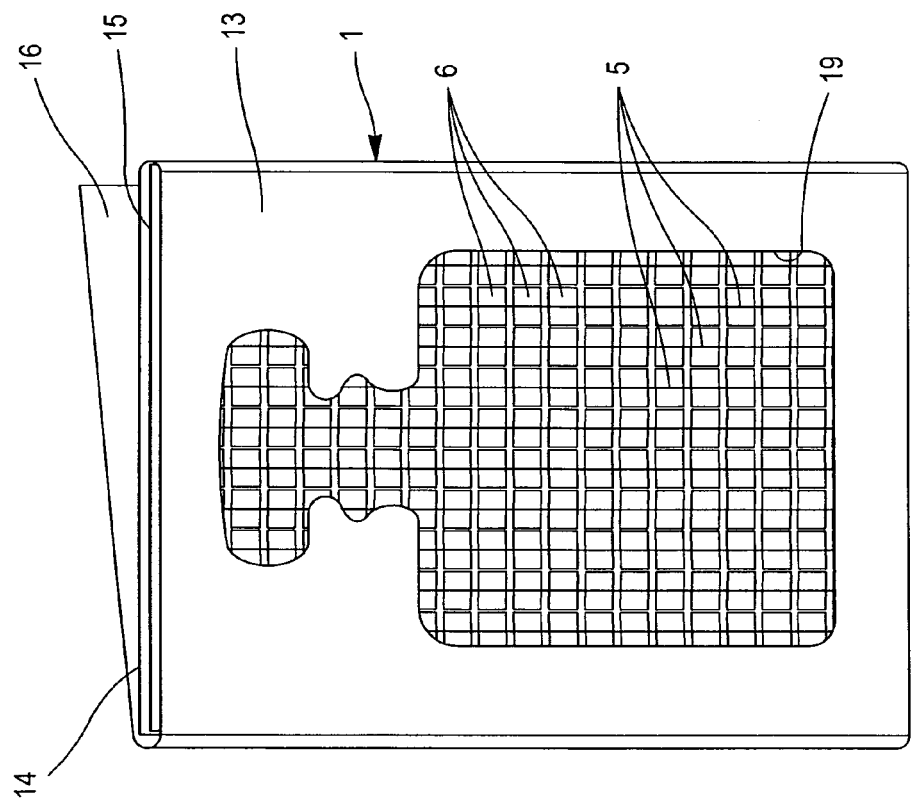

DECORATED CARD

FIELD OF THE INVENTION

The invention relates to a decorated card that can be used as a note card, a greetings card, an advertising card, an insert for a magazine, an element for a hanging mobile or "dangler", or as something else. The invention also relates to a method of manufacturing such a card.

BACKGROUND OF THE INVENTION

It is known that a note card can be formed from a cardstock sheet folded to form two leaves. By flattening the two leaves one against the other, it is possible to insert such a card into an envelope for storage or for being mailed. And once out of the envelope, and once the leaves are open, the card can be stood on a support, e.g. on the top of a piece of furniture or on a desktop.

The appeal of such card among the public is directly related to the decoration that it bears.

Thus, it is known, for example, to decorate the card with a structure that is inserted between the leaves and that goes from a flattened configuration to a deployed configuration when the leaves are opened. Patent Application FR 2 646 126 describes such a device.

It is also possible to create a decorative effect by forming a cutout in one of the leaves and by covering the area of the cutout with a panel of a different material, e.g. a panel of fabric. The shape of the opening may be evocative of the profile of an article, of an animal, or of something else. Patent Application EP 1 449 678 describes such a card. However, the result obtained with that mode of decoration is relatively unexciting. The embellishment of the cutout is uniform and has relief that is relatively featureless.

OBJECTS AND SUMMARY OF THE INVENTION

An object of the invention is to propose a decorated card having a cutout and an improved embellishment that sets off the shape of the cutout to greater advantage by more contrast and more relief.

Another object of the invention is to propose a method of manufacturing a decorated card that is simple to implement.

The decorated card of the invention comprises at least one leaf, a cutout formed in the leaf and defined by a cutout outline, at least two threads extending under tension across the cutout outline, and a plurality of spangles, the spangles being held suspended from each of the threads under tension so as to cover at least part of the area defined by the cutout outline.

The method of manufacturing a decorated card comprises the following steps:
  forming a cutout in a first panel in such a manner as to define a space defined by a cutout outline;
  forming non-intersecting slots in a second panel, the slots being inscribed within an outline of the slot ends, within which outline the cutout outline can be inscribed, the slots defining successive strips between them;
  mounting at least two threads under tension along non-intersecting lines across the outline of the slot ends in a direction transverse to the general direction of the slots, and while fastening the thread to each of the strips;
  splitting the strips between two successive lines in such a manner as to form a plurality of individual spangles held suspended by the threads; and
  superposing the first and the second panels.

BRIEF DESCRIPTION OF THE DRAWINGS

The invention can be better understood with reference to the following description and to the accompanying drawings.

FIGS. 6 to 10 show the various steps in manufacturing the card of FIG. 1.

MORE DETAILED DESCRIPTION

Figure 1:
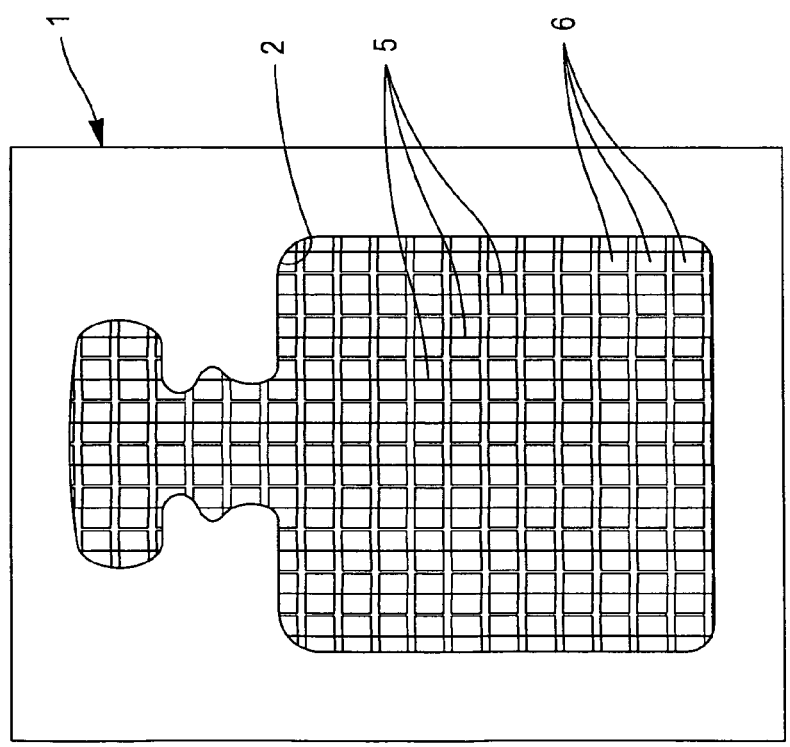
FIG. 1 is a front view of a non-limiting embodiment of a decorated card of the invention.

The decorated card shown in FIG. 1 has a leaf 1 that is made of any suitable material. For example, it is a portion of a cardstock sheet weighing more than 270 grams per square meter ($g/m^2$). Other weights or other materials may also be suitable.

For ease of understanding of the description, it should be understood that the height direction extends from bottom to top in FIG. 1, and that the width direction extends from left to right in FIG. 1. The depth direction should be understood as being a direction perpendicular to the plane of FIG. 1.

Thus, the sides of the leaf 1 extend parallel to the height direction and to the width direction. At the surface, the leaf is plain or else it may have color patterns, or indeed a pattern in relief formed by embossing.

In its central portion, the leaf 1 has a cutout that is defined by a cutout outline 2. In this example, the cutout outline has the outside shape of a bottle. This shape is non-limiting, and any other suitable shape is possible. In particular, the outline of the cutout may be evocative of an article, of a logo, of a letter of the alphabet, of a numeral, or of anything else. In FIG. 1, the cutout is in one piece. This is non-limiting, and the cutout could be made up of a plurality of parts, e.g. so as to be evocative of the characters of a brand name, of a trade name, or of anything else.

The cutout is defined by the cutout outline 2, and this outline itself defines a cutout area.

In accordance with the invention the cutout area is crossed by a plurality of threads 5 that extend under tension from one edge to the other of the cutout outline.

The threads are of any suitable type, e.g. they are threads made of natural fibers or they are synthetic threads. The threads may, themselves, be decorated. For example, they may be gold-colored.

The threads 5 extend across the cutout in non-intersecting manner. Preferably, they are mutually parallel. In FIG. 1, the threads extend in the height direction. However, it is possible for them to extend in some other direction.

Each thread 5 carries one or more spangles 6. The spangles are patches of dimensions that are small compared with the dimensions of the cutout. For example, these patches are cut out from a sheet of paper or of card.

Advantageously, the faces of said sheet are covered with a decoration that is of texture and/or of color contrasting with the texture or with the color of the leaf. In addition, the two faces of the sheet are advantageously decorated differently, in terms of color or of texture, e.g. one gloss face and one matt face.

Preferably, all of the spangles are of substantially the same shape and dimensions. The shape is preferably square or rectangular. However, this is non-limiting, and, for example, the spangles may be round. The dimensions of the spangles, the spacing of the threads 5, and the configuration of the spangles along a thread are defined in such a manner that two adjacent spangles do not have any overlap. When the threads are non-intersecting and non-parallel, the spangles may be of trapezoidal shape.

The threads 5 are under tension, i.e. they remain in the plane of the cutout regardless of the position of the leaf, and they are suitable for retaining the spangles.

The spangles are suspended from the threads, i.e. the threads hold the spangles fastened with two of their sides extending parallel to the direction of the threads. The spangles cannot slip along the threads. However, they can pivot about the threads as a function of the threads twisting.

Figure 2:
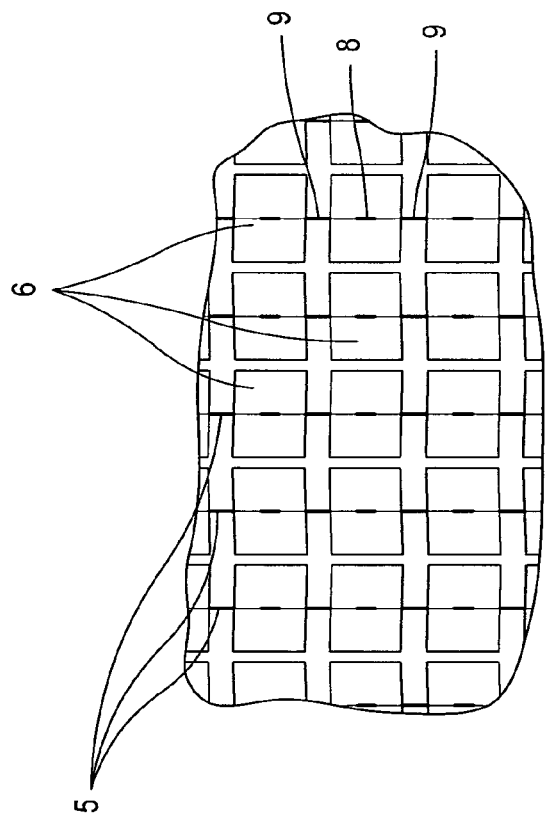
FIG. 2 is a view on a larger scale of the decoration of the card of FIG. 1.
Figure 3:
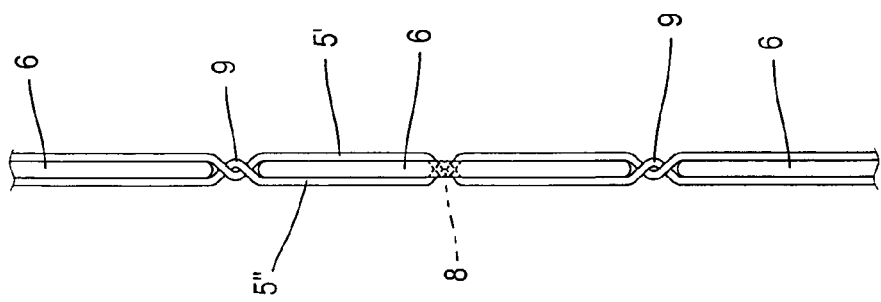
FIG. 3 shows how the spangles shown in FIGS. 1 and 2 are assembled together.
Figure 7:
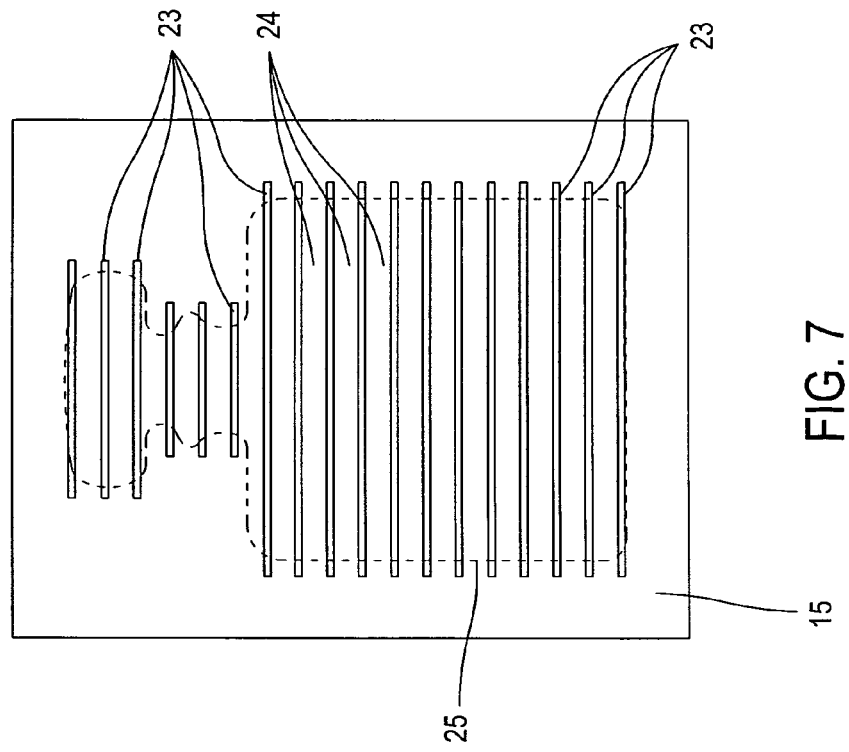
Figure 6:
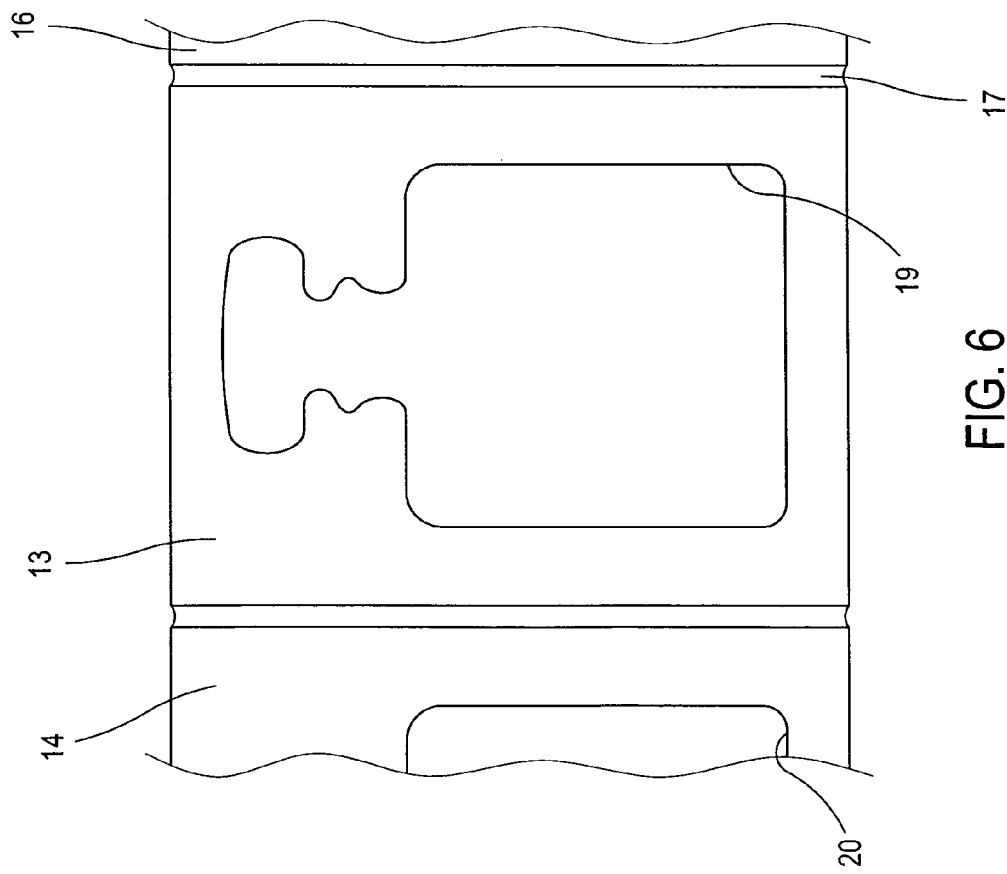

Various modes of suspension may be suitable. FIG. 3 shows the mode of suspension that is used for the card shown in FIGS. 1 and 2. The thread 5 actually comprises two strands 5' and 5" that are mutually parallel and that are offset in the depth direction. The strands 5' and 5" extend under tension along respective faces of the spangles 6. For any one spangle 6, the strands 5' and 5" cross over in a hole situated in the middle portion of the spangle. The strands also cross over in the gaps separating a spangle from the spangle below it and from the spangle above it. The cross-over zones are referenced 8 and 9 in FIGS. 2 and 3. Typically, the strands of thread are crossed by means of a sewing machine using the "straight stitch" technique. Thus, each spangle is held by three thread strand crossovers, one passing through it, and two flanking it. Under these conditions, the spangles cannot slip.

Figure 4:
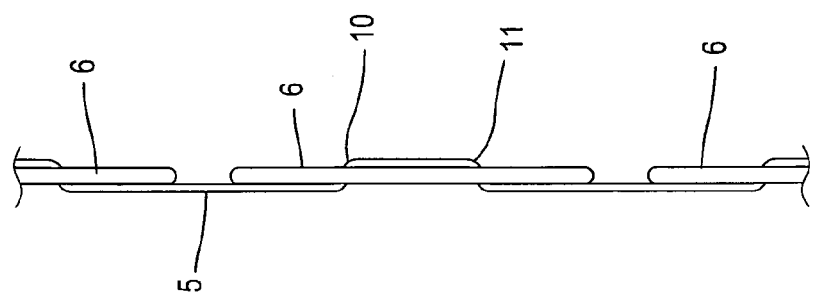
FIG. 4 shows a variant mode of assembling together the spangles.

A variant is shown in FIG. 4. Any thread 5 passes through each of the various spangles twice in zones situated in the middle portions thereof. The zones through which the thread passes are referenced 10 and 11 in FIG. 4. As described above, the spangles are retained by the tension of the thread 5 and therefore they cannot slip. However, they can pivot about the thread as a function of the thread twisting.

Other modes of fastening the spangles are possible, e.g. the thread could be adhesively bonded to the surfaces of the spangles.

As described in more detail below, in a preferred mode of manufacturing the card, the leaf is made up of various superposed panels, and the threads and the spangles are situated on a panel that is distinct from the panel that carries the cutout 2.

Thus, the spangles are held in suspension by the threads 5 while extending in the general direction of the threads 5. Initially, the spangles extend flat over the plane of the cutout area. However, as a function of the thread 5 twisting, the angular positioning of the spangles about the thread 5 can vary up to about one half-turn.

When they are extending flat, the spangles cover more than 50% of the area of the cutout 2, and preferably at least 70% of said area, or better still at least 80% of said area.

Ultimately, the spangles form a sort of mosaic that covers the area of the cutout 2. Because the spangles form a structure that is clearly distinct from the remainder of the leaf 1, they highlight the shape of the cutout. The cut of the spangles, their appearance, and the angular positioning they take up about the thread 5 give a natural relief and contrast effect that is markedly different from the remainder of the leaf. And from one card to another, the angular positioning of the spangles is not repetitive.

FIGS. 5 to 10 show a method of manufacturing a decorated card such as the above-described card.

Figure 5:
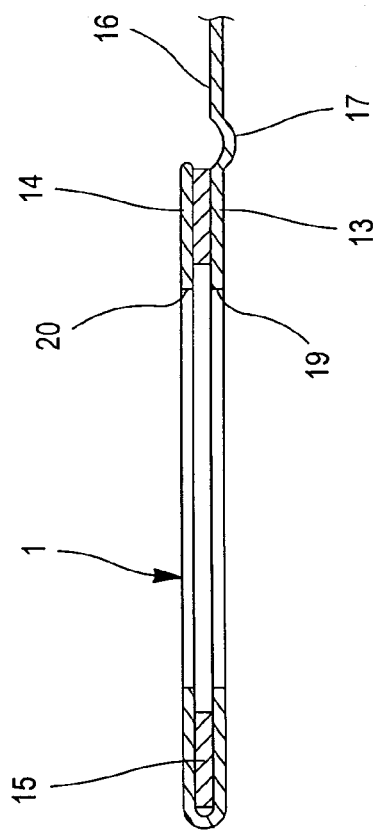
FIG. 5 shows how the card is assembled.

As shown in FIG. 5, the leaf 1 is made up of three superposed panels, namely a front panel 13, a back panel 14, and an intermediate panel 15 that is sandwiched between the two preceding panels.

Advantageously, the front panel and the back panel are made from the same strip of material, and they are folded over one against the other. In addition, the zone of the strip that forms the front panel 13 is extended opposite from the back panel so as to form a second leaf 16 that is connected to the first leaf 1 by a score line 17. This second leaf 16 has the same dimensions as the leaf 1 and it is designed to form a diptych therewith.

Also, the second leaf forms a background that is visible through the gaps between the spangles. It may be covered with a particular decoration so as to further accentuate the highlighting of the cutout, e.g. it may be colored with a plain color, or indeed covered with a film, e.g. with a gold-color film. However, the second leaf is optional. It could also be separate and mounted by adhesive bonding.

Each of the two panels 13 and 14 has a cutout defined by a cutout outline 19, 20. The cutouts are of identical shape, and they are placed in the panels in such a manner as to be superposed when the leaf 1 is assembled.

In parallel, the intermediate panel 15 is prepared. For example, it is made of cardstock of the same weight as the cardstock of the leaves 13 or 14, and it has dimensions substantially equal to the dimensions of the leaves 13 and 14.

The panel 15 is provided with a multitude of through slots 23 that extend parallel to one another or, in a variant, in non-intersecting manner. In the embodiment shown in FIG. 7, the slots extend in the width direction. The slots 23 define strips 24 between them. For example, the slots are spaced apart by 5 millimeters, and they have a width of 1 millimeter (mm), and thus define between them strips that have a width of 4 millimeters. Naturally, these values are given merely by way of indication. The length and the number of the slots are determined so that the zone covered by the slots fully covers the outlines of the cutouts 19 and 20 of the leaves 13 and 14. In other words, the ends of the slots form a closed curve within which the outlines 19 and 20 can be inscribed. In order to illustrate this, in FIG. 7, the chain-dotted line 25 shows the image of the outlines 19 and 20 projected on the panel 15. This image is inscribed fully within the outline of the slot ends.

The slots are formed in the panel 15 by any suitable means, e.g. by a punching operation.

Figure 8:
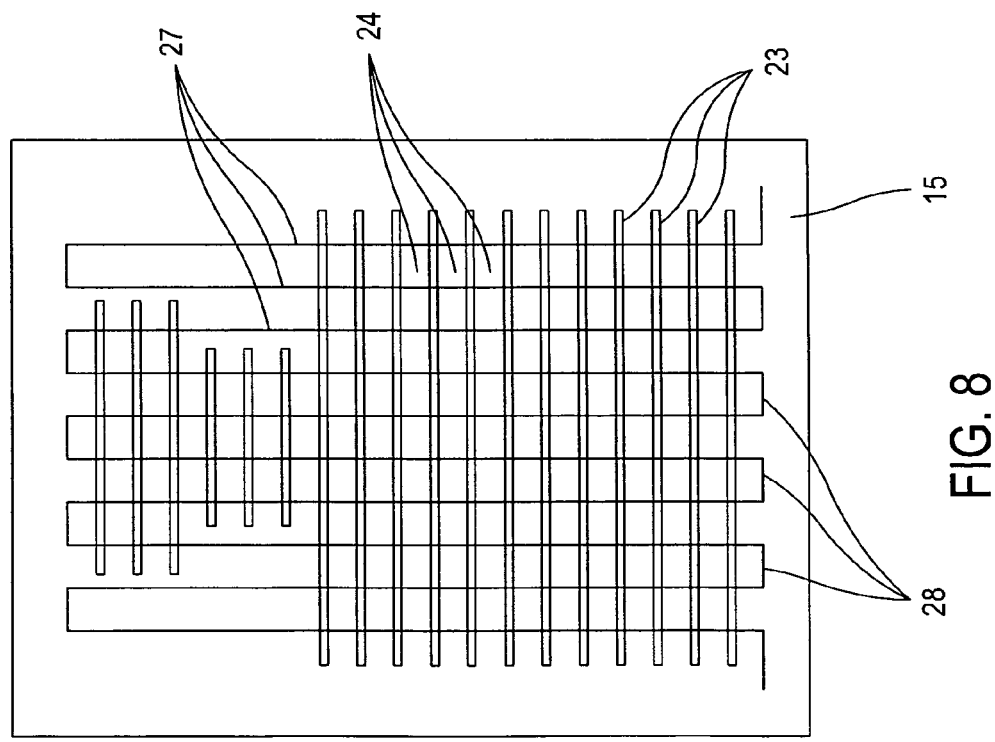

The next step is shown in FIG. 8. It consists in mounting the threads under tension from one edge to the other of the outline of the slot ends, across the strips and the slots, and in stitching the thread to each of the strips as the thread is taken across it. In the embodiment shown, a sewing machine is used to stitch the panel 15 along parallel lines 27 that are connected together in such a manner as to form a succession of crenellations 28. The lines 27 extend transversely to the direction of the slots so as to pass across the slots and the strips in succession. In FIG. 8, the lines extend in the height direction. In conventional manner, the machine stitches the panel with two strands of thread so as to form straight stitches. The strands of thread extend along respective faces and cross over at the stitches. The stitching pitch of the machine is defined in such a manner that a stitch is situated in each of the slots 23 and towards the middle of each strip 24, i.e. the pitch is one half of the spacing of the slots.

Preferably, the crenellations 28 are identical, and the lines 27 are thus equidistant from one another and have the same length. Therefore, in certain peripheral zones, the lines extend outside the outline of the slot ends.

Figure 9:
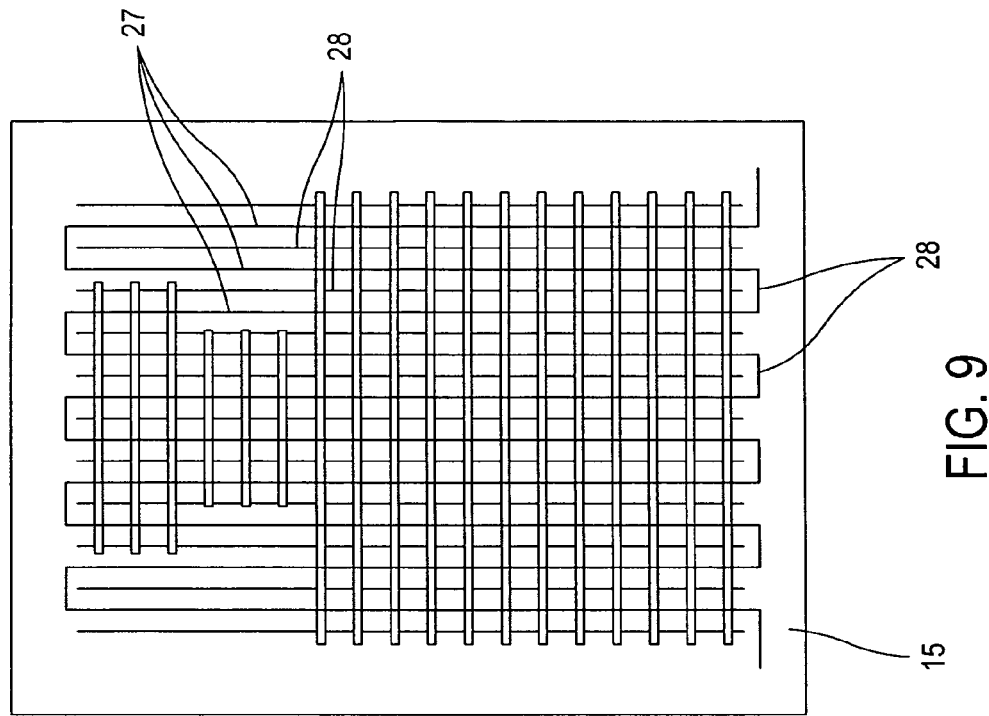

In the next step that is shown in FIG. 9, the strips are split between the lines 27, e.g. by means of a cutting blade. The split lines 28 extend parallel to the thread lines inside each of the crenellations 28.

The strips 24 as split in this way in the height direction form the spangles 6, and the lines 27 form the threads 5 for suspending the spangles.

In the next step in assembling the card, the panel 15 is inserted between the panels 13 and 14, and they are assembled together, e.g. by means of an adhesive or of any other suitable means. The spangles 6 appear within the outline of the cutout 19 in the front panel 13, and they allow the panel 16 to be seen through the cutout in the panel 14. Under the effect of the suspension threads 5 twisting, the spangles take up varying angular positions about the flat position in which they are placed in the plane of the panel 15. When the card is folded shut, the amplitude through which the spangles pivot is limited to within the thickness of the leaf 1. When the card is open, they can pivot through a larger amplitude.

Some of the spangles, namely those that are situated outside the outline image 25, together with the portions of thread from which they are suspended, are masked. They are held captive between the uninterrupted portions of the two panels 13 and 14.

Naturally, the present description is given merely by way of example, and other implementations of the invention may be adopted without going beyond the ambit thereof.

In particular, the number of threads is non-limiting, it is merely necessary to have at least two threads. Also, the second leaf 16 is optional. Similarly, one of the two panels 13 or 14, in particular the back panel 14, is optional If both panels are present, the cutout in one of the panels, namely in the front panel 13 or in the back panel 14, is optional, or said cutout may be of shape different from the shape of the cutout in the other panel. For example, one of the outlines may be a scaled-down version of the other outline. The outline of the slot ends is then determined in such a manner that the outlines of both of the cutouts are inscribed within the outline of the slot ends so that the outline of the larger cutout is inscribed within the outline of the slot ends.

The cutout outline is not necessarily a closed curve, and it is also possible to have a cutout outline that is open to the outside, in particular an outline that opens out on a side parallel to the direction of the threads.

In addition, the cutout may be made up of a plurality of parts so that said parts together form a set of articles or a set of letters.

When splitting the strips to form the spangles, it is possible to form two split lines that are close together between two adjacent threads, so as to form a gap between the spangles in the width direction.

The spangles may also be of shapes other than the rectangular shape that is described above.

The invention claimed is:

1. A decorated card, comprising:
    a panel;
    a cutout formed in the panel, defined by a cutout outline;
    at least two threads extending under tension across the cutout outline; and
    a plurality of spangles that are separated by slots extending transversely to the extension direction of the threads and that are held suspended from each of the threads under tension so as to cover at least a part of the area defined by the cutout outline, each of the spangles being suspended from a single one of the threads, wherein:
        the slots are formed in a panel distinct from the panel carrying the cutout, the panels being superposed on each other,
        the slots are inscribed within an outline of the ends of the slots, and
        the cutout outline is inscribed fully within the outline of the slot ends.

2. A card according to claim 1, wherein the threads under tension are non-intersecting.

3. A card according to claim 1, wherein the threads are mutually parallel.

4. A card according to claim 1, wherein the spangles are of the same shape and of the same dimensions.

5. A card according to claim 1, wherein the spangles cover at least 70% of the area of the cutout outline.

6. A card according to claim 2, wherein each of the threads comprises two strands under tension along respective faces of a said spangle, and the strands cross over in a hole situated in the middle portion of the said spangle and in gaps that separate the said spangle from the spangles above it and below it.

7. A card according to claim 1, wherein a said thread passes twice through each of the spangles in its middle portion.

8. A method of manufacturing a decorated card, the method comprising the following steps:
    forming a cutout in a first panel in such a manner as to define a space defined by a cutout outline;
    forming non-intersecting slots that define successive strips between them in a second panel distinct from the first panel, the slots being inscribed within an outline of ends of the slots, within which outline the cutout outline can be fully inscribed;
    while fastening to each of the strips, mounting at least two threads under tension along non-intersecting lines across the outline of the slot ends in a direction transverse to the general direction of the slots;
    splitting the strips between two successive ones of the lines in such a manner as to form a plurality of individual spangles held suspended by the threads, each of the spangles being suspended from a single one of the threads; and
    superposing the first and second panels.

* * * * *